US008095373B2

(12) United States Patent
Chiang et al.

(10) Patent No.: US 8,095,373 B2
(45) Date of Patent: Jan. 10, 2012

(54) ROBOT APPARATUS WITH VOCAL INTERACTIVE FUNCTION AND METHOD THEREFOR

(75) Inventors: Tsu-Li Chiang, Taipei Hsien (TW); Chuan-Hong Wang, Taipei Hsien (TW); Kuo-Pao Hung, Taipei Hsien (TW); Kuan-Hong Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 813 days.

(21) Appl. No.: 12/193,765

(22) Filed: Aug. 19, 2008

(65) Prior Publication Data

US 2009/0083039 A1 Mar. 26, 2009

(30) Foreign Application Priority Data

Sep. 21, 2007 (CN) .......................... 2007 1 0077338

(51) Int. Cl.
*G10L 15/00* (2006.01)
*G10L 21/00* (2006.01)

(52) U.S. Cl. ...... 704/275; 704/236; 704/270; 704/270.1

(58) Field of Classification Search ........................ None
See application file for complete search history.

(56) References Cited

U.S. PATENT DOCUMENTS

2009/0024816 A1* 1/2009 Thibadeau et al. ........... 711/167

* cited by examiner

*Primary Examiner* — Justin Rider
(74) *Attorney, Agent, or Firm* — Altis Law Group, Inc.

(57) ABSTRACT

The present invention provides a robot apparatus with a vocal interactive function. The robot apparatus receives a vocal input, and recognizes the vocal input. The robot apparatus stores a plurality of output data, a last output time of each of the output data, and a weighted value of each of the output data. The robot apparatus outputs output data according to the weighted values of all the output data corresponding to the vocal input, and updates the last output time of the output data. The robot apparatus calculates the weighted values of all the output data corresponding to the vocal input according to the last output time. Consequently, the robot apparatus may output different and variable output data when receiving the same vocal input. The present invention also provides a vocal interactive method adapted for the robot apparatus.

9 Claims, 2 Drawing Sheets

ROBOT APPARATUS WITH VOCAL INTERACTIVE FUNCTION AND METHOD THEREFOR

TECHNICAL FIELD

The present invention relates to robot apparatuses and, more particularly, to a robot apparatus with a vocal interactive function and a vocal interactive method for the robot apparatus according to weighted values of all output data corresponding to a vocal input.

GENERAL BACKGROUND

There are a variety of robots in the market today, such as electronic toys, electronic pets, and the like. Some robots may output a relevant sound when detecting a predetermined sound from an ambient environment. However, when the predetermined sound is detected, the robot would only output one predetermined kind of sound. Generally, before the robot is available for market distribution, manufactures store predetermined input sounds, predetermined output sounds, and relationships between the input sounds and the output sounds in the robot apparatus. When detecting an environment sound from the ambient environment, the robot outputs an output sound according to a relationship between the input sound and the output sound. Consequently, the robot only outputs one fixed output according to one fixed input, making the robot repetitiously dull and boring.

Accordingly, what is needed in the art is a robot apparatus that overcomes the aforementioned deficiencies.

SUMMARY

A robot apparatus with a vocal interactive function is provided. The robot apparatus comprises a microphone, a storage unit, a recognizing module, a selecting module, an output module, a counting module, and an updating module. The microphone is configured for collecting a vocal input. The storage unit is configured for storing a plurality of output data, a last output time of each of the output data, and a weighted value of each of the output data, wherein the weighted value is an inverse ratio to the last output time of the output data. The recognizing module is configured for recognizing the vocal input.

The selecting module is configured for acquiring all the output data corresponding to the vocal input in the storage unit and selecting one of the output data based on the weighted values of all the acquired output data. The output module is configured for outputting the selected output data. The output-time updating module is configured for updating the last output time of the selected output data. The weighted-value updating module is configured for calculating weighted values of all the output data corresponding to the vocal input according to the output count, and updating the weighted values of all the output data.

Other advantages and novel features will be drawn from the following detailed description with reference to the attached drawings.

BRIEF DESCRIPTION OF THE DRAWINGS

The components in the drawings are not necessarily drawn to scale, the emphasis instead being placed upon clearly illustrating the principles of the robot apparatus. Moreover, in the drawings, like reference numerals designate corresponding parts throughout the several views.

DETAILED DESCRIPTION OF THE EMBODIMENTS

Figure 1:
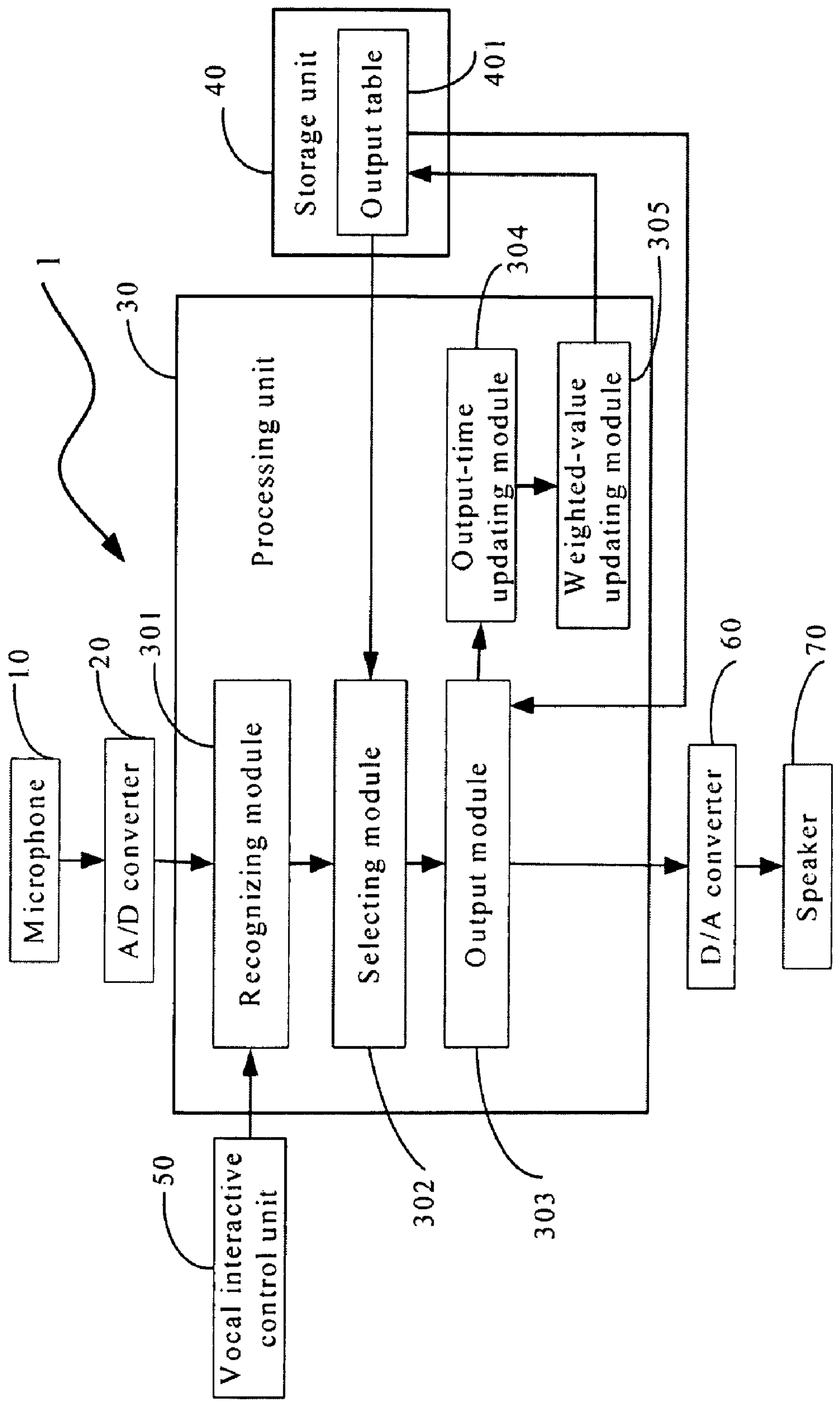
FIG. 1 is a block diagram of a hardware infrastructure of a robot apparatus in accordance with an exemplary embodiment of the present invention.

FIG. 1 is a block diagram of a hardware infrastructure of a robot apparatus in accordance with an exemplary embodiment of the present invention. The robot apparatus 1 includes a microphone 10, an analog-digital (A/D) converter 20, a processing unit 30, a storage unit 40, a vocal interactive control unit 50, a digital-analog (D/A) converter 60, and a speaker 70.

In the exemplary embodiment, the vocal interactive control unit 50 is configured for controlling the robot apparatus 1 to enter a vocal interactive mode or a silent mode. When the robot apparatus 1 is in the vocal interactive mode, the processing unit 30 controls the microphone 10 to detect and collect analog signals of a vocal input from the ambient environment. The A/D converter 20 converts the analog signals of the vocal input into digital signals. The processing unit 30 recognizes the digital signals of the vocal input and generates output data according to the vocal input.

When the robot apparatus 1 is in the silent mode, even if the microphone 10 detects for the analog signals of the vocal input, the robot apparatus 1 does not output anything according to the vocal input. In another exemplary embodiment of the present invention, the robot apparatus 1 detects and collects the vocal input in real-time and responds to the vocal input.

The storage unit 40 stores a plurality of output data and an output table 401. The output table 401 (see below for a sample table schema) includes a vocal input column, an output data column, a last output time column, and a weighted value column. The vocal input column records a plurality of vocal inputs, such as A, B, and the like. The output data column records a plurality of output data corresponding to the vocal inputs. For example, the output data corresponding to the vocal input A include A1, A2, A3, etc. The output data column further records output data corresponding to an undefined vocal input, which are not recorded in the vocal input column. For example, the output data corresponding to the undefined vocal input include Z1, Z2, Z3, etc.

Output Table

| Vocal input | Output data | Last output time | Weighted value |
|---|---|---|---|
| A | A1 | $t_{A1}$ | $W_{A1}$ |
| | A2 | $t_{A2}$ | $W_{A2}$ |
| | A3 | $t_{A3}$ | $W_{A3}$ |
| | . . . | . . . | . . . |
| B | B1 | $t_{B1}$ | $W_{B1}$ |
| | B2 | $t_{B2}$ | $W_{B2}$ |
| | B3 | $t_{B3}$ | $W_{B3}$ |
| | . . . | . . . | . . . |
| . . . | . . . | . . . | . . . |
| | Z1 | $t_{Z1}$ | $W_{Z1}$ |
| | Z2 | $t_{Z2}$ | $W_{Z2}$ |
| | Z3 | $t_{Z3}$ | $W_{Z3}$ |
| | . . . | . . . | . . . |

The last output time column records time that the output data was output recently. For example, last output time of the output data A1, A2, A3 is $t_{A1}$, $t_{A2}$, and $t_{A3}$. A format of the last output time is composed of, for example, XX hour: XX minute on XX month XX date, XXXX year. For example, the last output time $t_{A1}$ of the output data A1 is 15:20 on May 10, 2007. The weighted value column records a weighted value assigned to the output data. For example, a weighted value of the output data B3 is $W_{B3}$. The weighted value is an inverse ratio to the last output time of the output data. That is, the later the last output time is, the lower the weighted value is. For example, in an exemplary embodiment, a weighted value $W_{A(X)}$ of the output data A(X) is determined by a function: $W_{A(X)}=C(t_{A1}+t_{A2}+t_{A3}+\ldots+t_{A(X-1)})/t_{A(X)}$, wherein A(X) represents one of the output data corresponding to the vocal input A, and C represents a constant. For example, the weighted value $W_{A1}$ corresponding to the last output time $t_{A1}$ 15:20 on May 10, 2007 is 7, and the weighted value $W_{A2}$ corresponding to the last output time $t_{A2}$ 16:25 on May 10, 2007 is 5.

The weighted value can also be preconfigured according to a preference. The preference can be based on being the dad, the mom, the factory, etc. For example, the weighted value of a more preferred output can be increased manually and the weighted value of a less favored output can be decreased manually.

The processing unit 30 includes a recognizing module 301, a selecting module 302, an output module 303, an output-time updating module 304, and a weighted-value updating module 305.

The recognizing module 301 is configured for recognizing the digital signals of the vocal input from the A/D converter 20. The selecting module 302 is configured for acquiring all the output data corresponding to the vocal input in the output table 401 and selecting one of the output data based on the weighted values of all the acquired output data. That is, the higher the weighted value of the acquired output data is, the higher the probability of being selected. For example, suppose the vocal input is A and the weighted values $W_{A1}$, $W_{A2}$, $W_{A3}$, of all the output data A1, A2, A3 are 5, 7, 9, the selecting module 302 selects the output data A3 because the output data A3 has the highest weighted value.

The output module 303 is configured for acquiring the selected output data in the storage unit 40 and outputting the selected output data. The D/A converter 60 converts the selected output data into analog signals. The speaker 70 outputs a vocal output of the selected output data. The output-time updating module 304 is configured for updating the last output time of the selected output data in the output table 401, when the output module 303 outputs the selected output data. The weighted-value updating module 305 is configured for calculating weighted values of all the output data corresponding to the vocal input according to the last output time, and updating the weighted values of all the output data, when the output-time updating module 304 updates the last output time.

Figure 2:
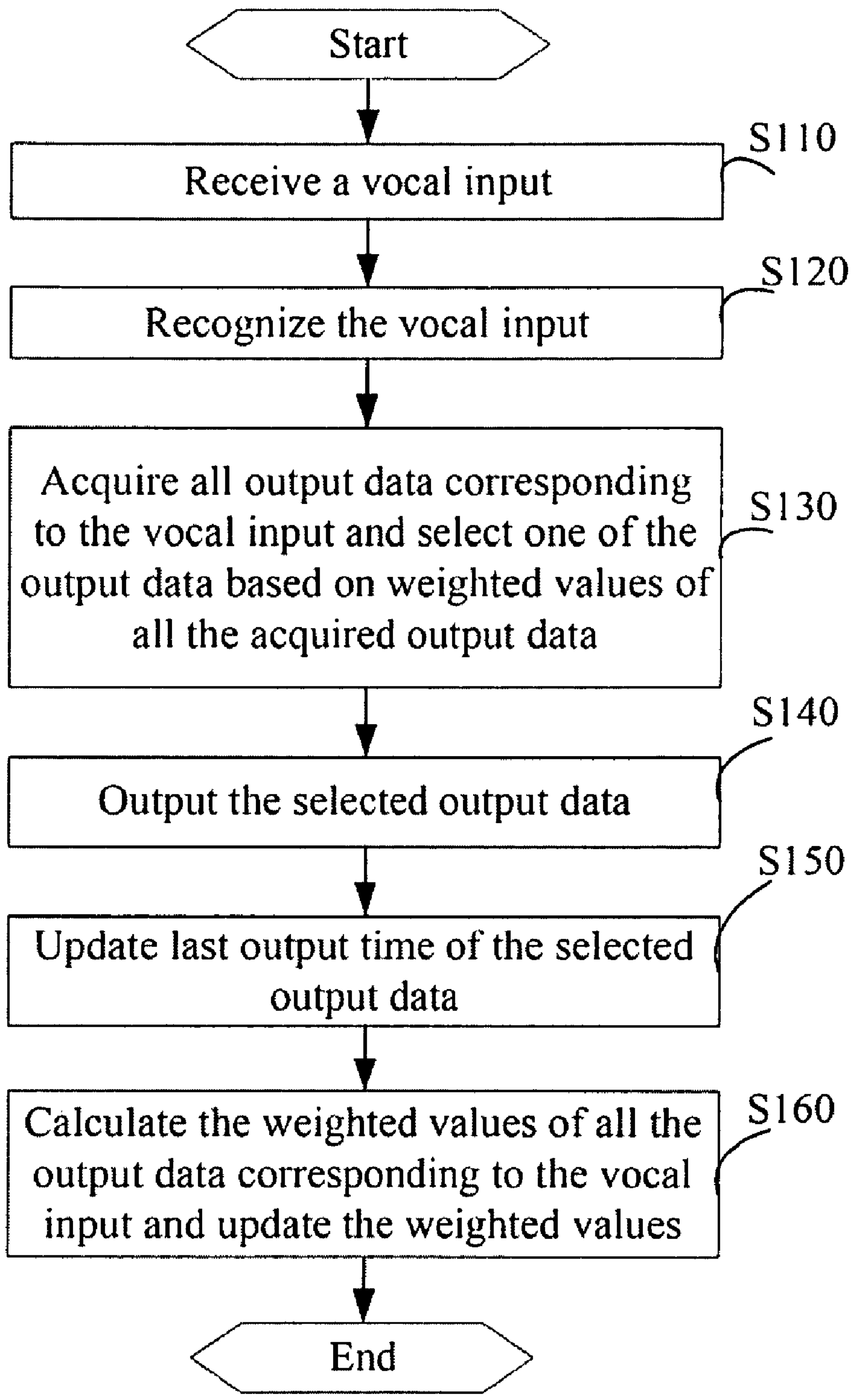
FIG. 2 is a flowchart illustrating a vocal interactive method that could be utilized by the robot apparatus of FIG. 1.

FIG. 2 is a flowchart illustrating a vocal interactive method that could be utilized by the robot apparatus of FIG. 1. In step S110, the microphone 10 receives the analog signals of the vocal input from the ambient environment, and the A/D converter 20 converts the analog signals into the digital signals. In step S120, the recognizing module 301 recognizes the digital signals of the vocal input. In step S130, the selecting module 302 acquires all the output data corresponding to the vocal input in the output table 401 and selects one of the output data based on the weighted values of all the acquired output data.

In step S140, the output module 303 acquires and outputs the selected output data in the storage unit 40, the D/A converter 60 converts the selected output data into the analog signals, and the speaker 70 outputs the vocal output of the selected output data. In step S150, the output-time updating module 304 updates the last output time of the selected output data. In step S160, the weighted-value updating module 305 calculates weighted values of all the output data corresponding to the vocal input according to the last output time, and updates the corresponding weighted values in the output table 401.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A robot apparatus with a vocal interactive function, comprising:

a microphone for collecting a vocal input;

a storage unit for storing a plurality of output data, a last output time of each of the output data, and a weighted value of each of the output data, wherein the weighted value is an inverse ratio to the last output time of the output data;

a recognizing module capable of recognizing the vocal input;

a selecting module capable of acquiring all the output data corresponding to the vocal input in the storage unit and selecting one of the output data based on the weighted values of all the acquired output data;

an output module capable of outputting the selected output data;

an output-time updating module capable of updating the last output time of the selected output data; and a weighted-value updating module capable of calculating weighted values of all the output data corresponding to the vocal input according to the last output time, and updating the weighted values of all the output data.

2. The robot apparatus as recited in claim 1, wherein the weighted value $W_{A(X)}$ of the output data A(X) is determined by a function: $W_{A(X)}=C(t_{A1}+t_{A2}+t_{A3}+\ldots+t_{A(X-1)})/t_{A(X)}$, wherein A(X) represents one of the output data corresponding to the vocal input A, C represents a constant, and $t_{A(X)}$ represents one of the last output time corresponding to the output data A(x).

3. The robot apparatus as recited in claim 1, wherein a format of the last output time is composed of XX hour: XX minute on XX month XX date, XXXX year.

4. The robot apparatus as recited in claim 1, wherein the storage unit further stores output data corresponding to an undefined vocal input that is not recorded in the storage unit.

5. The robot apparatus as recited in claim 1, further comprising a vocal interactive control unit capable of controlling the microphone to collect the vocal input.

6. A vocal interactive method for a robot apparatus, wherein the robot apparatus comprises a processing unit and a storage unit, the storage unit stores a plurality of output data, a last output time of each of the output data, and a weighted value of each of the output data, and the weighted value is an inverse ratio to the last output time of the output data, the method comprising:

the processing unit receiving a vocal input;

the processing unit recognizing the vocal input;

the processing unit acquiring all the output data corresponding to the vocal input and selecting one of the output data based on the weighted values of all the acquired output data;

the processing unit outputting the selected output data;

the processing unit updating the last output time of the selected output data; and the processing unit calculating weighted values of all the output data corresponding to the vocal input, and updating the weighted values of all the output data.

7. The vocal interactive method as recited in claim 6, wherein the updating step further comprises the processing unit determining the weighted value $W_{A(X)}$ of the output data A(X) according to a function: $W_{A(X)}=C(t_{A1}+t_{A2}+t_{A3}+ \ldots +t_{A(X)})/t_{A(X)}$, wherein A(X) represents one of the output data corresponding to a vocal input A, C represents a constant, and $t_{A(X)}$ represents one of the last output time corresponding to the output data A(x).

8. The vocal interactive method as recited in claim 6, further comprising the storage unit storing output data corresponding to an undefined vocal input that is not recorded in the robot apparatus.

9. The vocal interactive method as recited in claim 6, wherein a format of the last output time is composed of XX hour: XX minute on XX month XX date, XXXX year.

* * * * *